United States Patent [19]

Hulett

[11] 4,282,625
[45] Aug. 11, 1981

[54] SCRAPING TOOL FOR CLEANING COOKING GRILLS

[76] Inventor: Robert L. Hulett, 901 Tenlynn Ct., St. Louis, Mo. 63124

[21] Appl. No.: 129,028

[22] Filed: Mar. 10, 1980

[51] Int. Cl.³ .............................................. A47L 14/00
[52] U.S. Cl. .............................. 15/236 R; 15/104.04; 29/81 F; 30/169
[58] Field of Search ............... 15/104.04, 236 R, 237, 15/105, 111; 30/169, 172; 81/43; 128/354; 294/99 R, 33, 16; 29/81 F

[56] References Cited

U.S. PATENT DOCUMENTS

| | | | |
|---|---|---|---|
| 1,008,382 | 11/1911 | Sourek | 15/236 R X |
| 1,725,172 | 8/1929 | Anderson | 81/43 X |
| 2,505,289 | 4/1950 | Haslett | 294/99 R X |
| 2,722,148 | 11/1955 | Woyton | 81/43 |
| 2,747,911 | 5/1956 | Kuever | 15/236 R X |
| 2,857,607 | 10/1958 | South | 15/236 R X |
| 3,267,979 | 8/1966 | Gerardi | 81/43 X |
| 3,800,354 | 4/1974 | Stephens | 15/236 R |
| 3,820,185 | 6/1974 | Phillips | 15/236 R X |
| 4,176,417 | 12/1979 | Ruff | 15/105 X |
| 4,214,342 | 7/1980 | Amundsen | 15/236 R |

FOREIGN PATENT DOCUMENTS 554775 7/1943 United Kingdom ....................... 81/43

*Primary Examiner*—Chris K. Moore
*Attorney, Agent, or Firm*—Jerome A. Gross

[57] ABSTRACT

A tool for use in scrape-cleaning cooking grills and as a tongs is formed of two normally substantially parallel rod members in a plane joined at a closed loop end to form a handle. Forward of the handle each rod member curves to one side of and then projects as a scraper portion to the opposite side of the plane of the handle, all in a plane substantially perpendicular to the plane handle. Each scraper portion has a flat inner face, opposed to the other scraper portion, and a flat aft face, adjacent to the handle, which intersect in a substantially 90° cutting edge. The flat aft faces lie in a common plane.

6 Claims, 3 Drawing Figures

SCRAPING TOOL FOR CLEANING COOKING GRILLS

BACKGROUND OF THE INVENTION

The present invention relates to scrapers for cleaning cooking grills, such as used in barbecues.

In the use of barbecue grills and the like, fat and other food particles become attached to the grill and eventually char until quite difficult to remove. Various scraping tools have been devised to carry out this task, most with little practical or commercial success.

SUMMARY OF THE INVENTION

An object of the present invention is to provide a simple and inexpensive scraping tool for cleaning cooking grills.

Briefly summarized, the present grill scraping tool is comprised of a length of springy steel rod of circular-cross-section formed into two normally substantially parallel rod members extending, from a closed loop end, in a plane to serve as a handle portion. Forward of the handle portion, the two rod members curve to one side of the plane of the handle, and then project angularly to its opposite side in a plane substantially perpendicular to the plane of the handle, forming scraper portions. The scraper portions are each flat on their opposed inner sides and on their aft sides, providing faces which intersect at substantially a 90° angle to form a cutting edge. The flat aft faces of the two scraper portions lie in a common plane.

DESCRIPTION OF THE PREFERRED EMBODIMENT

The present invention is a simple, inexpensive-to manufacture tool useful for scraping off and removing charred food stuck to barbecue or other cooking grills. The tool may also be utilized as a tongs, such as for manipulating pieces of meat in barbecuing or other cooking.

Figure 1:
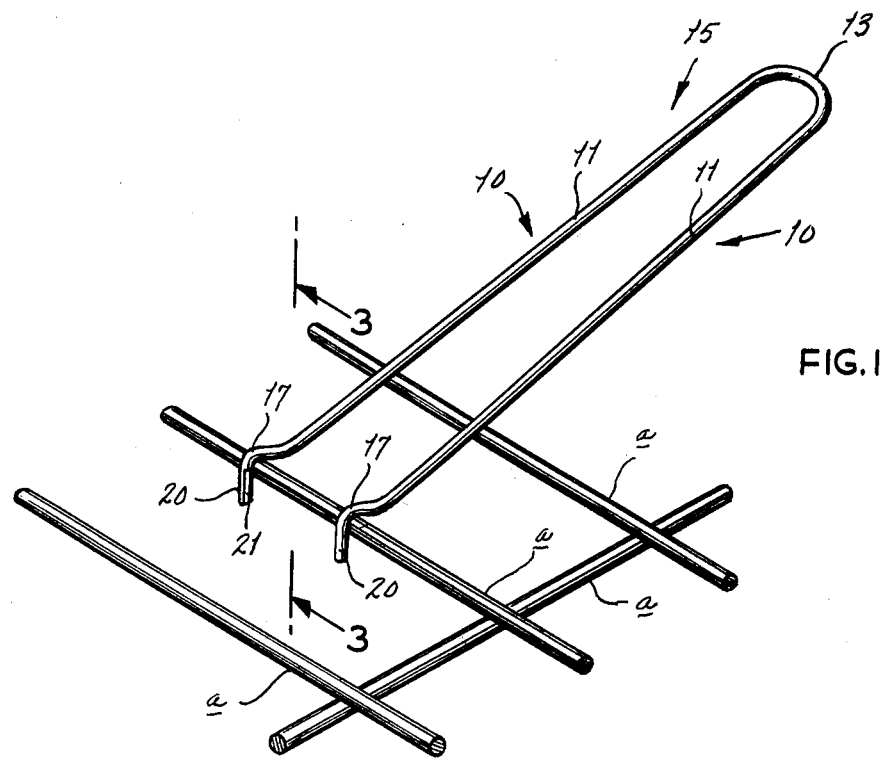
FIG. 1 is a perspective drawing of a preferred embodiment cooking grill scraper, shown with its scraper portions cleaning a barbecue grill.

Described in detail, a preferred embodiment of the present invention, as shown in FIG. 1, is made up of a single length of springy steel rod of generally circular cross-section; and having a small diameter, such as one-eighth inch. The steel rod is bended to provide a pair of substantially parallel rod members extending in a plane, each generally designated 10. The aft portions 11 of the two rod members 10 lead at their aft ends to a loop portion 13 continuous with the rod member aft portions 11, joining the pair and forming them into a continuous member. The rod member aft ends 11 and loop portion 13 together form a handle, generally designated 15.

Forward of the handle 15, the rod members 10 each have a curved portion 17 at which the steel rod curves outward away from the handle 15, in a plane substantially perpendicular to the plane of the handle. The extent of the departure from the plane of the handle is, in the preferred embodiment, about two diameters of the rod.

At the extreme forward end of each rod member 10, immediately adjacent to the curved portions 17, each rod member 10 extends from the curved portions 17 to project angularly in the same plane as the curved portions 17 to the side of the plane of the handle opposite the curved portions, whereby to form scraper portions 20. The angle at which the scraper portions 20 project relative to the plane of the handle 15 is, in the preferred embodiment shown, approximately 105°; any angle between 90° and 120° is believed to be best, though other angles may be appropriate. The extent of the projection of the scraper portions 20 beyond the plane of the handle 15 is approximately two diameters of the steel rod.

Each scraper portion 20 has a flat inner face 21 on its side adjacent to the other scraper portion 20 and a flat aft face 22 on its side adjacent to the handle 15. The inner and aft flat faces 21, 22 of each scraper portion intersect at substantially a 90° angle, forming a cutting edge 23; the flat faces 21, 22 may be formed by grinding or by a cold forging process.

Figure 2:
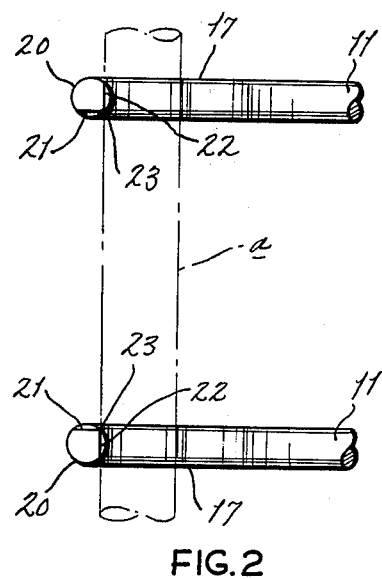
FIG. 2 is a partial view from the underside of the scraper of FIG. 1, illustrating the cutting edges of the scraper portions; the grill is shown in phantom lines.
Figure 3:
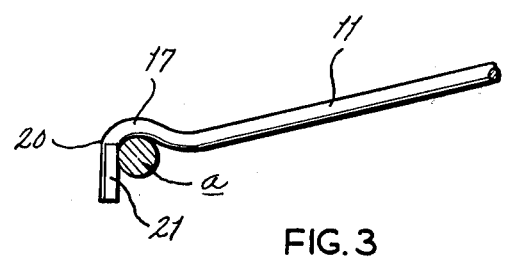
FIG. 3 is a sectional view, taken along line 3—3 of FIG. 1, showing the inner side of the scraper.

The present invention is useful for scraping charred food particles and the like from cooking grills, particularly those of the type made up of a plurality of parallel steel rods a of circular cross-section positioned in a horizontal plane over an open fire, such as used in barbecuing or other outdoor cooking. In this use, the tool is grasped by its handle 15 and the aft faces 22 of both of its scraper portions 20 are positioned against a steel rod a of a cooking grill, as shown in the drawings. Because the two aft faces 22 are in a common plane, they may both lie flat against the rod a simultaneously, as shown in FIG. 2. To scrape the rod a, the tool is simply slided side-to-side with the aft scraper portion faces 22 so against the rod; the 90° cutting edge 23 scrapes the charred material from the rod a. To scrape the surface of the rod a about its entire circumference the handle 15 is merely raised or lowered to rotate the scraping portions 20 about the rod a; the tool is reversed to scrape the opposite side of the rod a.

Should there be a heavy local deposit on the rod a of the grill, the springy steel handle 15 may be compressed so that the cutting edges 23 of the scraper portions 20 are drawn toward each other, effectively cutting such deposit rather than merely scraping it. In either type of use, the curved portions 17 of the two rod members 10 serve as positioning means for the tool, simplifying placement of the scraper portions 20 over the rod a.

The preferred embodiment of the present invention, as described above and shown in the accompanying drawings, also has a secondary use as a tongs. By constructing the tool of springy steel and providing the spaced-apart forward ends widened by the curved portions 17 and projecting scraper portions 20, it may be squeezed about a piece of meat, charcoal or a cooking grill, to lift and move the objects about, such as is conventionally done in barbecuing.

The above embodiment is described merely to illustrate the invention; modifications of the embodiment will be apparent. For example, any means to fixedly join the aft portions of the rod members may be utilized in lieu of the one-piece loop handle shown. The flat faces of the scraper portion may intersect at any angle which will serve as a cutting edge, though in the embodiment shown the angle is 90°. From these examples, other modifications will suggest themselves.

I claim:
1. A cooking grill scraper, comprising
a pair of normally substantially parallel rod members of generally circular cross-section,
the pair of rod members extending aft in a plane, and further comprising means to join the aft portions of the rod members,
whereby to form a handle,
each of said pair of rod members having, forward of the handle, a scraper portion projecting angularly in a plane substantially perpendicular to the plane of the handle,
each scraper portion characterized by having
a flat inner face on its side opposed to the other scraper portion, and having
a flat aft face on its side adjacent to the handle,
the flat inner and aft faces of each scraper portion intersecting in a cutting edge.
2. The cooking grill scraper defined in claim 1, wherein
said pair of rod members are of springy steel, and wherein
each rod member has, between its said aft-extending portion and scraper portion, a curved portion extending to the side of such plane of the handle opposite to the projection of said scraper portion.
3. The cooking grill scraper defined in claim 1, wherein
the aft faces of the two said scraper portions lie in a common plane.
4. The cooking grill scraper defined in claim 1, wherein
the angle at which each of said scraper portions so project in said longitudinal plane perpendicular to the plane of the handle is greater than 90° and less than 120°.
5. The cooking grill scraper defined in claim 1, wherein
the intersection of said flat inner and aft faces is substantially a 90° angle.
6. The cooking grill scraper defined in claim 1, wherein
said means to join the aft portions of the pair of rod members is a loop portion continuous with said pair and forming said pair into a continuous member.

* * * * *